(12) United States Patent
Frost et al.

(10) Patent No.: US 8,501,076 B2
(45) Date of Patent: Aug. 6, 2013

(54) COMPOSITE EXTERIOR CLADDING PANEL

(75) Inventors: Gordon J. Frost, Howe, IN (US);
Steven L. Kilmer, Elkhart, IN (US)

(73) Assignee: Noble Composites Inc., Goshen, IN (US)

( * ) Notice: Subject to any disclaimer, the term of this patent is extended or adjusted under 35 U.S.C. 154(b) by 16 days.

(21) Appl. No.: 12/749,242

(22) Filed: Mar. 29, 2010

(65) Prior Publication Data

US 2011/0052862 A1    Mar. 3, 2011

Related U.S. Application Data

(63) Continuation of application No. 10/692,155, filed on Oct. 22, 2003, now abandoned.

(60) Provisional application No. 60/420,153, filed on Oct. 22, 2002.

(51) Int. Cl.
*B29C 51/10* (2006.01)

(52) U.S. Cl.
USPC .............................. 264/511; 264/510; 264/571

(58) Field of Classification Search
None
See application file for complete search history.

(56) References Cited

U.S. PATENT DOCUMENTS 4,879,152 A * 11/1989 Green ............................. 428/73
4,942,013 A *  7/1990 Palmer et al. ................. 264/511
5,508,085 A *  4/1996 Lockshaw et al. ............ 428/178

* cited by examiner

*Primary Examiner* — Monica A Huson

(57) ABSTRACT

A new cladding panel for use on recreational vehicles is produced by either a hand-laid or vacuum infusion process. In the hand-laid method, the cladding is formed by first introducing and curing a layer of gel coat onto a mold surface. Layers of fiber reinforced resin material are subsequently laid onto the gel coating and molded to form the cladding panel. In the vacuum infusion process, the gel coating is first laid onto a mold surface of a vacuum infusion mold, and then dry ply materials are laid onto the gel coating. The mold is closed and a resin component is infused into the dry laminate material under vacuum pressure and cured. The cladding panels produced by these methods produced are seamless and have limited waste associated with post-production trimming processes. Cladding panels produced using the vacuum infusion process have a more consistent composition and achieve improved part-to-part consistency.

10 Claims, 2 Drawing Sheets

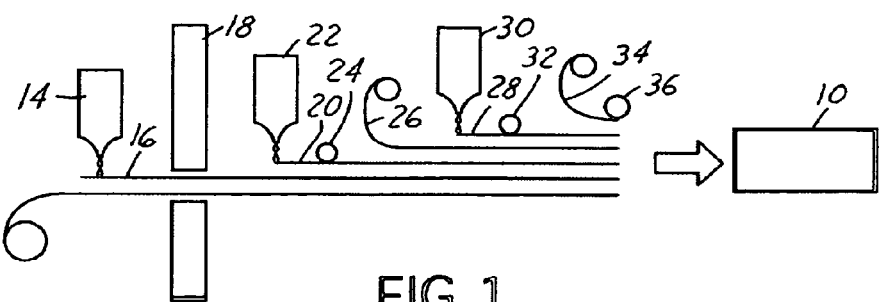
FIG. 1
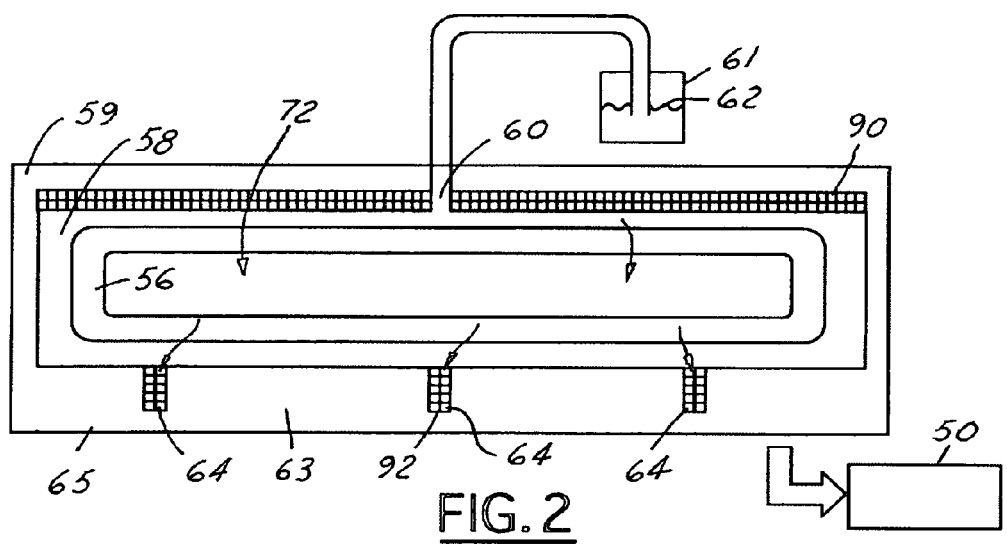
FIG. 2
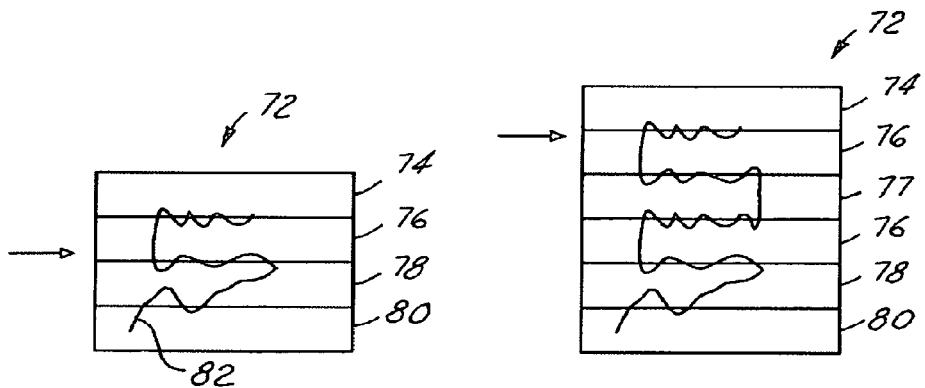
FIG. 3
FIG. 4

COMPOSITE EXTERIOR CLADDING PANEL

RELATED APPLICATIONS

The present application claims benefit under 35 U.S.C. §119(e) of provisional application No. 60/420,153, filed Oct. 22, 2002, and benefit under 35 U.S.C. §120 of application Ser. No. 10/692,155, filed Oct. 22, 2003; the entire contents of each of the two mentioned applications is incorporated herein by reference.

TECHNICAL FIELD

The present invention generally relates to reinforced cladding panels and more specifically to composite exterior cladding panels without a separate backer material.

BACKGROUND OF THE INVENTION

It is commonplace with recreational vehicles, such as campers or motor homes, to use glass fiber-reinforced wall panels, or cladding panels, for some of their exterior surfaces. These wall panels can vary in width up to, for example, 1.6 to 3 meters (6 to 10 feet), and can have lengths of up to 12 meters (40 ft.) or more. While the composite material from which the panels are made provides an adequate material for the recreational vehicle side walls, the presently utilized processes and equipment for manufacturing the composite material invariably may emit volatile organic compounds (VOC's), both within the facility and as exhaust to the atmosphere.

One process of making the composite materials first begins with use of an elongate mold. The molds are slightly larger than the panels to be produced. The upper surfaces of the molds are finished to provide a substantially flat and smooth surface, since this surface forms the visible exterior surface of the panels.

The prepared mold is first sprayed with a coating known as a gel coating, which cures to form a high gloss exterior surface for the panel. Once cured, a resin material and fiberglass, referred to as laminate, are applied to the top surface of the gel coating, and then a plurality of panels, typically hard board (such as lauan panels) are positioned side by side on top of the fiberglass. The seams between the panels are covered with a seam reinforcement material, and a vacuum bag is then placed over the top of the panels and a slight vacuum is introduced to hold laminate and wood in compression during cure to form a finished product. Once the molding process is complete, the product is pulled from the mold and cut and trimmed to the proper size.

One method of applying the gel coating and laminates is to maintain the elongate mold stationary, and move the gel-coating and laminate sprayers longitudinally and spray the entire length of the elongate mold. While this provides for an excellent layer of gel coating and laminate on the mold, capturing the fumes of the gel coating and laminate (resin) can be difficult, due to the movement of the sprayers and size of the mold. Alternatively, a mold may be moved under a gel coat and resin applicator, such as described in U.S. Pats. Nos. 6,755,633 (Miller) and 6,854,499 (Miller), which are incorporated herein by reference in their entirety ("Miller").

Additionally, a natural product is typically used as a backer material, such as lauan. Lauan is typically available in sheets of 1.2 meters×2.4 meters (4 ft.×8 ft.) dimensions, and creates processing and cosmetic concerns inherent to the material. These drawbacks include inconsistencies in quality (moisture content, weight variation, density variation, etc.), rot, water absorption, and telegraphing seam lines due to the difference in size of the lauan backer relative to the final product. Furthermore, as maintenance of the molds is required, the molds are moved into and out of their various positions by way of a forklift and roller dolly(s), which due to the size of the elongate mold, can be a difficult operation. The objects of the invention are therefore to overcome the shortcomings of the prior art.

SUMMARY OF THE INVENTION

The present invention provides a new cladding panel that is easy to manufacture and addresses some of the problems found in the prior art.

In one method, called the hand-laid method, the cladding is formed by first introducing a layer of gel coat onto a mold surface. The gel coat is preferably sprayed on the mold surface, either using a hand sprayer or a reciprocator, and then the gel coat is allowed to cure. Next, a layer of laminate (resin and chopped fiberglass fibers) material is applied by being sprayed onto the gel coat, and then a layer of core material (generally a mat) is de-reeled onto the uncured laminate. Once the core material is in place, a second layer of laminate is applied onto the core material (again preferably using a reciprocator). Rollers are used at various stages to press out any air between the layers, especially after each resin/chop application and preferably after the core material is added. The rollers may include automated rollers attached to the reciprocator, and preferably include a number of operators using hand rollers as well. A light weight veil material is preferably laid onto the second layer of laminate and rolled in to create a smooth back side. The resin is then cured to form the cladding material. Additionally, it may be desirable to apply a veil on top of the gel coat layer for an improved exterior surface.

In another method, the vacuum infusion method, a layer of gel coat is first cured onto a mold surface. A layer of dry fabric ply materials is de-reeled onto the gel coated mold, the ply material preferably consisting of a number of layers to achieve desired properties. These layers, which preferably include one or more fibrous mats (such as chopped glass mattings), one or more layers of core matting material, one or more layers of flow medium (optional), and one of more layers of veil material (optional), all of which can optionally be stitched together, are de-reeled onto the gel coated mold. Alternatively, such layers can be needled or adhesively or otherwise bonded. Less preferably, the layers may be merely placed on top of each other. In any event, such bonding should not be visible on the surface of the molded part. Preferably the ply materials are generally dry plies.

After the ply materials are positioned on the mold, the mold is closed by placing a silicone vacuum bag over the mold encompassing the gel coated surface and dry plies. The vacuum bag is sealed along the perimeter of the mold and vacuum is applied. Once substantially all of the air is thus removed from beneath the bag, the resin delivery system is attached and resin is introduced into the dry ply layers by siphoning the resin into the vacuum bag by means of the difference in atmospheric pressure. The vacuum bag is removed when the dry laminate material is substantially entirely infused with the resin component and preferably after the resin has cured to at least the "gelled" point. The complete structure is then preferably left on the mold until the resin is then fully cured, thereby forming the cladding panel.

The present invention offers many advantages over prior and cladding manufacturing processes. First, the cladding panels may be produced without the seams commonly found in the prior art, while having a good exterior surface, preferably without fiber prominence and preferably forming a nearly perfect flat surface without visible imperfections, such as waviness, seams, or visible surface markings from manufacturing equipment. Also, the amount of waste associated with post-production trimming processes is greatly reduced. Third, the vacuum infusion process produces cladding panels with more consistent resin content throughout the laminate. Fourth, the vacuum infusion process can be precisely controlled in terms of the amount of resin delivered to the laminate panel, thereby ensuring part-to-part consistency and decreasing resin waste. Fifth, the vacuum infusion process (close molding) prevents all volatile organic compounds from being emitted into the environment. Sixth, the water absorption and rotting associated with wood backers is not of concern with an all-composite panel.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

BRIEF DESCRIPTION OF DRAWINGS

FIG. 1 describes a hand-laid process for making a cladding panel according to a preferred embodiment of the present invention;

FIG. 2 is a top view of a vacuum infusion mold containing a gel coated layer and the dry ply layers according to another preferred embodiment of the present invention;

FIG. 3 is a section view of the laminate material of FIG. 2 according to one preferred embodiment;

FIG. 4 is a section view of the laminate material of FIG. 2 according to another preferred embodiment;

DETAILED DESCRIPTION AND PREFERRED EMBODIMENTS OF THE INVENTION

Figure 5:
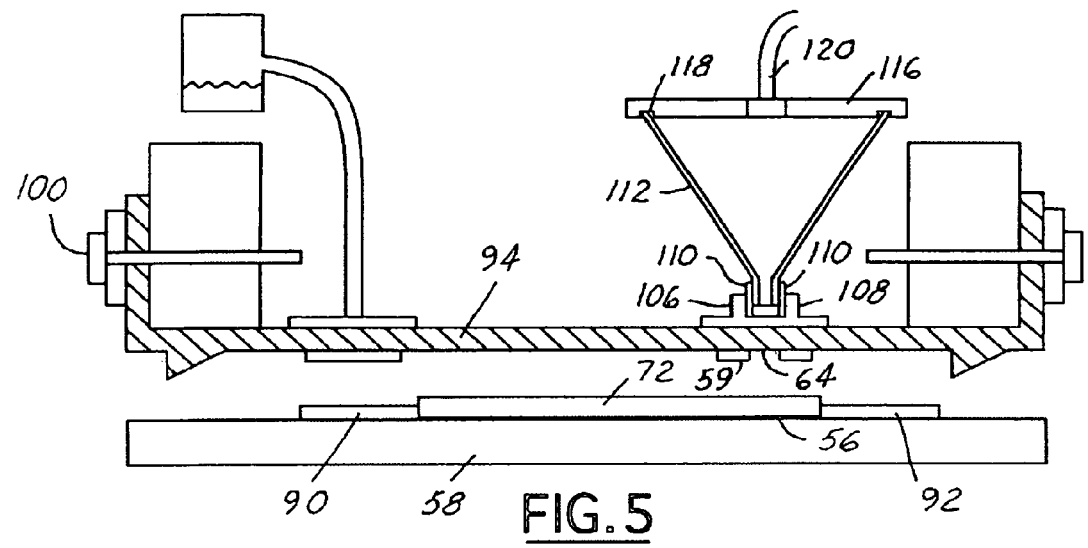
FIG. 5 is a side view of a portion of the vacuum infusion mold of FIG. 2.

In one preferred embodiment of the present invention, as shown in FIG. 1 as a "hand-laid process" for making the cladding panel 10, the method begins by activating a spray apparatus 14 such that a layer 16 of a gel coat material is applied onto a mold surface 12. Preferably the gel coat layers are applied using a reciprocator, such as those sold by Magnum-Venus of Kent, Wash. Preferably, the wet layer 16 is applied at a rate to produce a dry thickness of between approximately 0.3556 mm and 0.4064 mm. As one of ordinary skill in the art would appreciate, multiple spray apparatus 14 may be used to apply the gel coating to achieve the desired thickness. For example, two such apparatus may be used, in which each apparatus introduces approximately one half of the desired thickness of the layer 16. Similarly, each apparatus 14 could spray a gel-coating layer 16 at a different thickness, where the sum of the thickness of the layers is within a desired range. The gel coating is preferably a commercially available polyester or polyester-based resin having low hazardous air pollutants (HAPs). Furthermore, the gel coat layers may be applied manually by an operator.

Layer 16 is allowed to set at room temperature (generally 80 degrees Fahrenheit), whereby the gel coating is substantially cured. The curing conditions will depend upon numerous factors, including the composition of the gel coating and the thickness of the gel-coating layer 16. For a dry thickness of the finished gel-coating layer being approximately 14-16 mils according to a preferred embodiment of the present invention, the curing time is about 45 minutes at 80 degrees Fahrenheit. Of course, the gel-coating layer 16 could be introduced through an oven 18 or using a heated mold surface, thereby accelerating the cure time of the gel-coated surface. In an alternative embodiment, a film layer is applied to the mold in place of the gel coat layer, the film comprising an exterior grade film, and may include graphics for the RV sidewall. One example of such a commercially available film is SOLL™ film, available from GE Plastics.

As the gel coat layer 16 has adequately cured or exits the oven 18, a laminate layer 20 is introduced to the layer 16 from a laminate machine 22 having a desired thickness. The first laminate layer 20 is approximately 45 to 50 mils in wet thickness and contains a resin and a chopped fiber material introduced simultaneously through applicator devices (nozzles) contained within the machine 22, such devices preferably comprising one or more reciprocators, such as sold by Magnum-Venus of Kent, Wash. Preferably, the fiber material comprises glass fibers, natural fibers or synthetic fibers, each of which is used as a composite reinforcement. Preferably the fibers comprise about 23-25% of the total weight of the laminate layer 20, but the glass content may be higher, up to 29% or more. Similarly, the fiber content could be lower, but the resulting laminate may require more resin, or may not have adequate tensile strength or thermal properties. Alternatively, the layer 20 may comprise chopped fibers, continuous fibers, or roll goods made from chopped or continuous fibers, or a combination of fibers and roll goods. Further, the layer 20 may comprise a resin-impregnated sheet of reinforcement material. The sheet 12 having layers 16 and 20 is then introduced through a series of roller mechanisms 24 or similar devices known to those of skill in the art to remove air from within the laminate layer 20. Such roller mechanisms may comprise automated rollers such as those available from Magnum-Venus with its reciprocators, and/or may comprise operators using manual rollers. Preferably the sheet is rolled after each layer of laminate is applied.

The chopped fiber material is preferably a chopped glass fiber material in roving, continuous filament or strand form, and is chopped to approximately 1 inch in length. Some preferred chopped fiber materials include chopped 207 Roving, chopped strand matting, and chopped continuous filaments, all available from Owens Corning in many forms.

The resin material is preferably a polyester modified resin that cures at ambient temperatures. The resin may contain approximately 1-2% by weight MEKP (methyl ethyl ketone peroxide) as a curing agent depending upon ambient conditions.

As one of ordinary skill in the art would appreciate, multiple laminate machines 22 and rollers 24 may be used in series to apply the laminate layer 20 to achieve the desired wet thickness. For example, two laminate machines 22 and two roller mechanism 24 sets may be used in series, in which each laminate machine 22 introduces a portion of the desired thickness of the laminate layer 20. As such, each laminate machine 22 may apply a different thickness, or the same thickness, of the laminate material such that the sum total of all the applications is within the desired wet thickness range.

Next, a core material 26 is preferably laid onto the laminate layer 20, in such manner that substantially all the air is removed between the laminate layer 20 and core material 26. A roller mechanism (not shown) or similar device may be used to ensure that substantially all of the air is removed between the laminate layer 20 and core material 26, or a vacuum system may be utilized to remove excess air.

The core material 26 consists of core glass fiber bound together with a binder resin. The core glass fiber for use in the core material 26 preferably has a nominal length of about 15.875 mm (0.625 inches) and has a diameter of approximately 13 micrometers. The binder resin is preferably a modified polyvinylacrylate, acrylic, or equivalent binder resin. Two preferred core materials include C2050-KA15 and C2035-KA05, each commercially available from Owens Corning. In an alternative embodiment (not shown), the core material 26 includes a second layer to replace the glass in the laminate layer 20.

Preferably, a second layer of laminate material 28 is then introduced from a second laminate machine 30 onto the core material 26. The second layer of laminate material preferably has a composition that is similar to that of the first layer of laminate material 20, and is applied to a wet thickness similar to that of the first layer 22. A roller mechanism 32 is used to push out air from the second laminate layer 28. As described above, a series of laminate machines and/or roller mechanisms may be used to ensure that the laminate layer 28 is air free and of proper thickness. It may optionally also be desirable to apply a resin-coat to the top of the laminate material to fully wet out the laminate material and the veil described below. In a further alternative embodiment (not shown), the second laminate layer is attached to the core material, preferably on the opposite side to which a first laminate is likewise attached.

Next, a light-facing veil 34 is preferably applied to the second laminate layer 28. The addition of the light-facing veil 34 provides a smooth desirable finish for the cladding panel 10. The veil 34 also provides a smooth surface for bonding. A roller mechanism 36 lightly presses the veil 34 to ensure complete wetout of the resin component of the laminate material of the second layer 28 within the interstices of the veil 34. A similar veil may be provided adjacent the gel coat layer 16, to provide for an improved exterior surface. In an alternative embodiment, one or more such veils may be attached to the laminate layers, and/or to the core material as described above.

The light-facing veil 34 comprises a chopped fiber strand having an acrylic, polyvinyl alcohol (PVA) or urea/formaldehyde binder system and a strand thickness of approximately 11 to 13 microns in diameter. One veil 34 that may be used is C40S-XD34, a chopped glass fiber strand having a modified polyvinyl alcohol and acrylic binder system and fiber strand thickness of approximately 11 microns. C40S-XD34 is a product commercially available from Owens Corning. In an alternative embodiment, a similar veil may be applied between the gel coat layer and the laminate layers. Finally, the part is then allowed to sit to substantially cure the resin components of the laminate layers 20, 28, therein forming the cladding panel 10. Preferably, this occurs in approximately 60 to 90 minutes, depending upon the ambient conditions on the manufacturing line and the composition of the resin. Although not shown here, a vacuum bag may be applied to the backside of the layers prior to, or during, cure. Heat and/or UV may be applied to promote the cure of the resin. Such a process may be formed on a stationary mold, or in a moving mold, or in a continuous process as described in the Miller patents referred to above.

The cladding panel 10 formed according to the process of FIG. 1 offers numerous advantages over the prior art. First, a cladding panel 10 may be produced without the seams commonly found in the prior art. Also, the amount of waste associated with post-production trimming processes is greatly reduced. Thirdly, the surface of the panel is improved. Fourth, the properties of the panel may be tailored to the application, such that the layers may impart strength or performance characteristics for particular customer applications. Additionally, although not shown, a customer may require cutouts (e.g. for a window), and such a panel may include a provision in the mold or an insert on top of the mold to for the cutout, or to limit the amount of resin and/or reinforcement that is discarded when making such a cutout.

Another preferred method for making a cladding panel 50, as shown in FIGS. 2-6 below, utilizes a vacuum infusion process for making the cladding panel. The vacuum infusion process offers substantial improvement in terms of part-to-part efficiency and limits the amount of scrap as compared with normal cladding panel production processes.

As shown in FIG. 2, a process for making the cladding panel 50 begins by applying a wet layer of gel coating 56 to a mold surface 58 of a tool 65 at a desired wet thickness. The mold surface 58 is large enough to form an entire cladding panel 50 and typically has a size ranging from 180 to 350 square feet. As shown above in FIG. 1, the gel coating 56 is preferably applied using a spray apparatus. Preferably, the thickness of the gel coating 56 is between approximately 0.18 and 0.20 inches wet. Edge masking tape (not shown) is added to an outer portion 59 of the mold surface 58 to catch overspray from the accumulated gel coat material. Preferably, polypropylene edge masking shields are attached to gel coating spray equipment to prevent marring or scratching of the tool surface while controlling overspray on edges. The composition of the gel coating 56 is similar to the gel-coating layer 16 of FIG. 1 and is allowed to cure at ambient temperatures for about 45 minutes (depending upon gel coat composition and ambient conditions). The edge masking sheets are then removed, thereby exposing the outer portion 59 of the mold surface 58. It may also be preferred to remove the masking tape prior to the gel coat 56 completing its cure. As noted above, a film may be applied in place of the gel coat layer and may include custom graphics.

Now referring to a preferred mold design for an infusion process, an outer portion 59 on one side (shown as the upper side of FIG. 2) of the mold surface 58 also has an injection port 60 coupled to a resin holding tank 61 that contains a quantity of resin 62. The opposite side 63 of the outer portion 59 of the tool 65 has one or more vacuum ports 64 coupled to a vacuum source (not shown). It may be preferred that the resin injection port(s) 60 and vacuum port(s) 64 be designed to access the distribution netting 90 and vacuum netting 92 through the silicone vacuum bag 94.

Next, a layer of dry plies materials 72 is laid onto the cured gel coated layer 56. As shown in FIG. 3, the dry plies layer of ply material 72 preferably includes a number of layers. In a preferred embodiment, the layer of ply materials 72 comprises a first chopped glass fiber layer 74, a core material layer 76, a second glass fiber layer 78, and a veil layer 80 (optional) preferably stitched together using a stitching material 82. The stitching material 82 is preferably a material that minimizes the potential for preferential shrinking at the stitching sites. One preferred stitching material 82 is a polyester-based multifilament yarn. As noted above, the layers preferably each comprise a glass fiber layer.

The first and second chopped glass fiber layers 74, 78 preferably comprise a wide variety of glass or polymer fiber types chopped to approximately 1 inch in length. One preferable chopped material used in the glass layer 74, 78 comprises gun-roving chop of approximately 2 inches in length.

The core material layer 76 preferably comprises a core glass fiber bound together with a binder resin. The core glass fiber preferably has a nominal length of about 0.625 inches having a diameter of approximately 13 micrometers. The binder resin is preferably a modified polyvinylacrylate, acrylic, or equivalent binder resin. Two preferred core materials include C2050KA15 and C2035KA05, each commercially available from Owens Corning. While the core material layer 76 is shown as one layer in FIG. 3, it may consist of multiple thinner layers such that the total thickness substantially corresponds to the thickness as shown in FIG. 3 and may be preferable to allow the resin 62 to more easily penetrate the layer 76 during the infusion process described below.

The optional veil layer 80 is substantially similar to the light facing veil 34 of FIG. 1 above.

In an alternative embodiment, as shown in FIG. 4, a flow medium layer 77 may be introduced between two layers of core material 76. The flow medium layer 77 consists of a 3-dimensional woven fabric made of either glass or polyester fibers or a combination of glass and polyester fibers, a needle punched layer, or other such open-structure layer. Exemplary flow media include EnkaFusion® Matting, Enkamat®, Colbond®, Polybeam™, Lantor Soric®, Divinymat®, or other commercially available flow media. The layer 77 provides an additional flow path for the resin 62 used in the infusion process described below in that it lies perpendicular to the length of the adjacent layers 76 during the infusion process and may be compressed into a thinner layer when the dry plies layer 72 is compressed during the resin infusion process as will be described in more detail below.

Referring again to FIG. 2, a reusable distribution netting, or injection netting 90, is placed on one side of the mold surface 58 to cover the injection port 60. Also, a vacuum netting 92 is placed on the opposite side 63 of the outer portion 59 to cover vacuum ports 64. A reusable vacuum bag 94 is then placed on top of the dry laminate and sealed to the outer portion 59 of the tool 65, therein defining a chamber 96 between the vacuum bag 94, outer portion 59, and mold surface 58. As best shown in FIG. 5, an infusion system support frame 98 is lowered and coupled to the tool 65. A bolt 100 compresses the bag 94 to the frame 98 using a steel strap (not shown). An injection fitting (not shown) is then attached to the injection port 60 in a manner well known in the art. The injection fitting is coupled to the injection reservoir containing the resin 72.

Alternatively, the infusion may be performed using a distribution media system, such as described in U.S. Pat. No. 4,902,215 (Seeman), or using a core with channels, such as in U.S. Pat. No. 6,721,034 (Seeman et al.), or using a mold with conduits, such as shown in U.S. Pat. No. 6,406,659 and U.S. Pat. No. 6,919,039 (Lang et al.), each of which is incorporated herein by reference in its entirety. Each such system may be referred to generally as a vacuum infusion system.

The reusable vacuum bag 94 is made of a flexible material that is capable of sealing to and compressing the dry plies layer 72 when a vacuum is introduced to the chamber 96 through the vacuum ports 64. The bag 94 should not stick to the resin 62 component that is introduced through the injection port 60 during the vacuum infusion process, thereby allowing the bag 94 to be reused in subsequent operations. One preferred reusable bag 94 is a solid sheet of platinum cured silicon. Another is a semi-rigid thin composite bag of woven fiberglass and either a polyester or vinyl ester resin. One skilled in the art appreciates the bag could alternatively comprise a more durable upper die, preferably made from a tooling material, such as a composite die.

Figure 6:
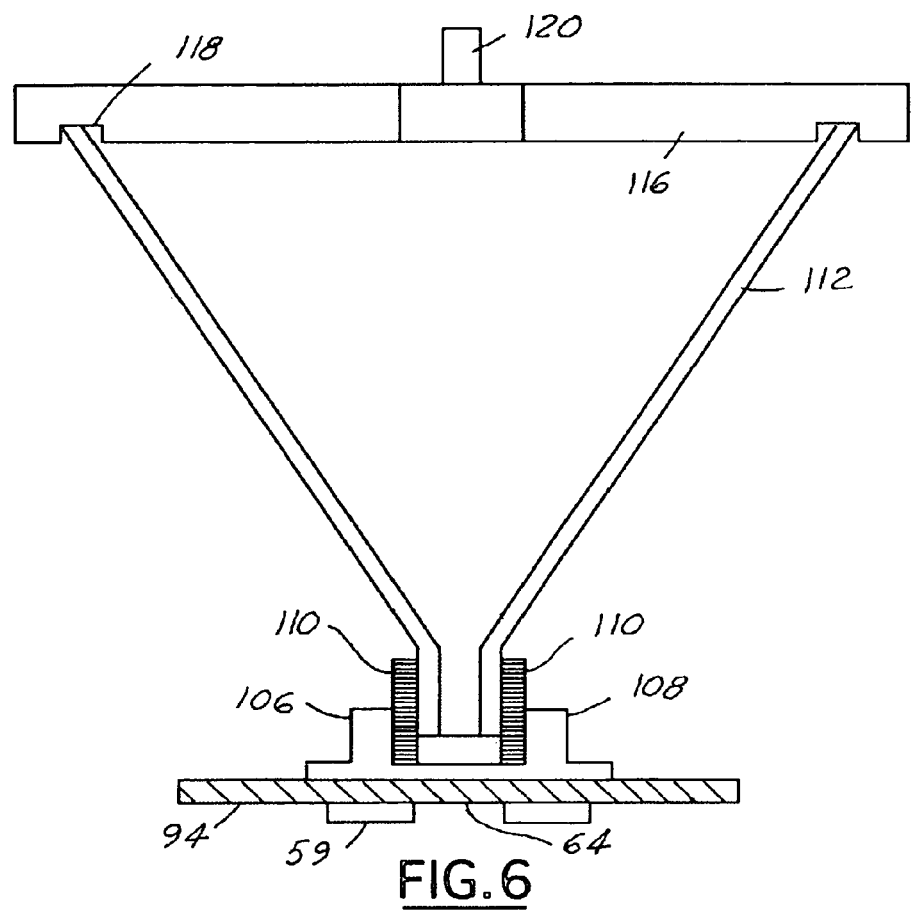
FIG. 6 is a side view of another portion of the vacuum infusion mold of FIG. 2.

For each vacuum port 64, a vacuum trap is required for collecting excess resin 62. As shown in FIG. 6, the vacuum traps are heavy weight polypropylene funnels 112 that are rated for vacuum. The funnel 112 slips directly into a bag fitting and seals to the fitting. For each funnel 112 a top 116 made of polypropylene that has a recess 118 machined into it for the sealing to the funnel 112. A vacuum fitting 120 is attached to the top 116 that is coupled to the vacuum source (not shown).

The funnel 112 is attached to the bag 94 through a pair of threaded polypropylene bulked flanged fittings 106, 108 that sandwich the bag 94 between the fittings. The use of polypropylene ensures the release of any resin 62 that collects in the fittings 106, 108. Each fitting 106, 108 preferably utilizes an RTV silicone sealer 110.

To form the cladding 50, a vacuum is then applied through the vacuum ports 64 by the vacuum source. The vacuum allows injected resin 62, which is maintained at a viscosity preferably of no greater than 175 centipoise, to flow along a path of least resistance from the injection port 60 towards the vacuum port 64. The vacuum pressure is maintained between 25 and 35 inches of mercury pressure (roughly corresponding to 14 pounds per square foot of vacuum pressure), and more preferably between approximately 26 and 29 inches. Thus, the resin 62, shown by arrows on FIG. 2, first enters the injection netting 90 through the injection port 60 and is distributed along the length of the injection netting 90. The resin 62 then proceeds into the dry ply layers 72 towards the vacuum ports 64, thereby infusing the dry laminate layer with resin 62. The vacuum netting 92 substantially prevents the flow of the resin 62 through the vacuum port 64.

The resin 62 that is injected is preferably a polyester modified resin that cures at ambient temperatures similar to the resin material contained in laminate layers 22, 28 of FIG. 1. As described above, the resin 62 has a viscosity of no greater than 175 centipoise to allow it to flow freely through the ply 72. The resin 62 is chosen from a wide variety of ambiently curable resins that are common to the wall panel industry. One commercially available resin that meets these criteria is CoREZYN COR 45-222-024, available from Interplastic. Another commercially available resin is R834-DPE-12, a low shrink resin transfer molding (RTM) polyester resin available from AOC.

While the resin 62 is being infused, the bag 94 is sucked downward and compresses the dry ply materials 72 as a function of the amount of vacuum applied through the vacuum ports 64. By controlling the amount of vacuum applied, the thickness of the infused laminate material, and hence the thickness of the cladding panel 50, can be precisely controlled. As described above, the presence of the flow medium layer 77 provides an additional flow path for the resin 62 even as the bag 94 compresses the dry ply layer 72.

After infusion process is completed and the resin has cured to the point of gelling, the vacuum is removed and the injection port 60 closed. The infusion support frame 98 is lifted and the bag 94 uncoupled from the surface ply materials 72 and outer surface 59. The resin 62 is then allowed to cure within the laminate structure to form the cladding panel 50. Typically, the curing process takes approximately 45 to 60 minutes, depending upon manufacturing line conditions. Alternatively, a heated mold could be used to expedite the process, or a UV-curable resin may be used. The cladding panel 50 may then be removed from the mold surface 58 and trimmed along its edges to its desired size to remove any residual flashing. Additionally, the mold could be configured to include provisions for cutouts (such as windows in the RV), or discardable inserts be added within the mold, so as to minimize the amount of molded composite material to be discarded.

While illustrated in a stationary mold, the invention may be practiced using moving molds or in a continuous process such as taught in the Miller applications, although not illustrated here. In such a system, a moving mold (or continuous belt) is provided with discrete vacuum bags provided thereabove. The bags are connected to a vacuum source to permit injection of the resin and/or to ensure substantially all air is evacuated and/or to promote complete infusion, while ensuring that cure is properly promoted.

The cladding panel 50 formed according to the process of FIGS. 2-6 offers numerous advantages over the prior art. First, a cladding panel 50 may be produced without the seams commonly found in the prior art. Also, the amount of waste associated with post-production trimming processes is greatly reduced. Third, the vacuum infusion process produces cladding panels 50 with a more consistent resin content throughout the laminate. Fourth, the vacuum infusion process can be precisely controlled in terms of the amount of resin delivered to the laminate panel, thereby ensuring part-to-part consistency and decreasing resin waste. Fifth, the vacuum infusion process (close molding) substantially prevents VOC's associated with the delivery of the resin from being emitted into the environment. Sixth, the water absorption and rotting associated with wood backers is not applicable with an all-composite panel.

While the invention has been described in terms of preferred embodiments, it will be understood, of course, that the invention is not limited thereto since modifications may be made by those skilled in the art, particularly in light of the foregoing teachings.

What is claimed is:

1. A method for forming a seamless cladding panel comprising:
   providing a mold having a mold surface;
   providing a coating layer on the mold surface to a first desired dry thickness;
   introducing a first laminate layer on the coating layer at a first desired thickness;
   introducing a seamless layer of core material on the first laminate layer, the core material comprising a plurality of fibers;
   introducing a second laminate layer on the core material at a second desired thickness, the first laminate layer and the second laminate layer each comprising a resin and a fiber material;
   optionally introducing a light facing veil onto the second laminate layer, the light facing veil comprising a fibrous strand and a binder system, wherein a portion of the resin of the second laminate layer substantially wets out the fibrous strand; and
   curing the resin of the first laminate layer and the second laminate layer.

2. A method for forming a seamless cladding panel according to claim 1, wherein the core material comprises a plurality of glass fibers bound together with a binder resin.

3. The method of claim 2, wherein the glass fibers of the core material have an average nominal length of about 0.625 inches.

4. The method of claim 3, wherein the glass fibers of the core material have an average diameter of about 13 micrometers.

5. The method of claim 4, wherein the binder material of the core material is selected from the group consisting of a modified polyvinylacrylate binder material and an acrylic binder material.

6. A method for forming a seamless cladding panel according to claim 1, wherein said step of introducing the seamless layer of core material comprises de-reeling the core material onto the first laminate layer.

7. A method for forming a seamless cladding panel comprising:
   providing a mold having a mold surface, the mold surface having an outer portion, the outer portion having a first side and a second side, the first side having an injection port and the second side of the mold surface having at least one vacuum port;
   providing a wet layer of coating to the mold surface;
   introducing a layer of dry plies onto the coating layer, the layer of dry plies comprising a first fiber layer, a core material layer, an optional flow medium layer, a second fiber layer, and an optional veil layer stitched or otherwise secured together when introduced onto the coating layer;
   introducing an injection netting within the mold to cover the injection port, the injection netting located between the injection port and the wet layer;
   introducing a vacuum netting within the mold to cover the at least one vacuum port, the vacuum netting located between the at least one vacuum port and the wet layer;
   coupling a vacuum bag onto the layer of dry plies within the mold, sealing the vacuum bag to the outer portion, therein forming a chamber defined within the mold between the outer portion, the vacuum bag, and the mold surface;
   coupling a vacuum source to the at least one vacuum port;
   introducing a vacuum pressure through the vacuum port;
   introducing an ambiently curable binder resin through the injection port to infuse the layer of dry plies, wherein the vacuum pressure seals the vacuum bag to the layer of dry plies such that the vacuum bag compresses the layer of dry plies to a desired thickness;
   removing the vacuum pressure;
   closing the injection port;
   curing the ambiently curable binder resin to form the seamless cladding panel within the mold; and
   removing the seamless cladding panel from the mold.

8. A method for forming a seamless cladding panel according to claim 7, wherein said step of introducing the seamless layer of core material comprises de-reeling the core material onto the first laminate layer.

9. A method for forming a seamless cladding panel comprising:
   providing a mold having a mold surface, the mold surface having an outer portion, the outer portion having a first side and a second side, the first side having an injection port and the second side of the mold surface having at least one vacuum port;
   providing a layer of coating on the mold surface in a substantially dry form;
   introducing a layer of dry plies onto the coating layer, the layer of dry plies comprising a first fiber layer, a core material layer, an optional flow medium layer, a second fiber layer, and an optional veil layer stitched or otherwise secured together when introduced onto the coating layer;
   coupling a vacuum bag onto the layer of dry plies within the mold, the bag defining a plurality of resin flow channels, and sealing the vacuum bag to the outer portion, therein forming a chamber defined within the mold between the outer portion, the vacuum bag, and the mold surface;
   coupling a vacuum source to the at least one vacuum port;
   introducing a vacuum pressure through the vacuum port;
   introducing a curable binder resin through the injection port to infuse the layer of dry plies, wherein the vacuum pressure seals the vacuum bag to the layer of dry plies such that the vacuum bag compresses the layer of dry plies to a desired thickness;

removing the vacuum pressure;

closing the injection port;

curing the curable binder resin to form the seamless cladding panel within the mold; and removing the seamless cladding panel from the mold.

10. A method for forming a seamless cladding panel according to claim 9, wherein said step of introducing the seamless layer of core material comprises de-reeling the core material onto the first laminate layer.

* * * * *